US007036633B2

(12) United States Patent
Lanzafame

(10) Patent No.: US 7,036,633 B2
(45) Date of Patent: May 2, 2006

(54) QUICK RELEASE FOR LADDER LEVELERS

(76) Inventor: Philip F. Lanzafame, PO Box 2834, Poulsbo, WA (US) 98370

( * ) Notice: Subject to any disclaimer, the term of this patent is extended or adjusted under 35 U.S.C. 154(b) by 0 days.

(21) Appl. No.: 10/697,674

(22) Filed: Oct. 29, 2003

(65) Prior Publication Data

US 2005/0092550 A1 May 5, 2005

(51) Int. Cl.
*E06C 1/00* (2006.01)
*F16M 11/24* (2006.01)

(52) U.S. Cl. .................................... 182/200; 248/188.2

(58) Field of Classification Search ........ 182/200–204; 248/188.1–188.5
See application file for complete search history.

(56) References Cited

U.S. PATENT DOCUMENTS

| | | | |
|---|---|---|---|
| 63,468 | A | 4/1867 | Card |
| 769,419 | A | 9/1904 | Wagner |
| 783,259 | A | 2/1905 | Friend |
| 891,729 | A | 6/1908 | Phipps |
| 970,425 | A | 9/1910 | Curran |
| 971,997 | A | 12/1910 | Brasington |
| 979,821 | A | 12/1910 | Brasington |
| 1,033,685 | A | 7/1912 | Eskew |
| 1,223,367 | A | 4/1917 | Brown |
| 1,236,269 | A | 8/1917 | Cole |
| 1,251,192 | A | 12/1917 | Drummond |
| 1,265,636 | A | 5/1918 | Farnsworth |
| 1,280,741 | A | 10/1918 | Hunn |
| 1,329,740 | A | 2/1920 | Barron |
| 1,376,777 | A | 5/1921 | O'Connor |
| 1,393,536 | A | 10/1921 | Hunt |
| 1,419,748 | A | 6/1922 | Miller |
| 1,462,505 | A | 7/1923 | Hunt |
| 1,508,392 | A | 9/1924 | Heun |
| 1,560,978 | A | 11/1925 | Crump |
| 1,733,338 | A | 10/1929 | Enke |
| 1,862,171 | A | 6/1932 | Baker |
| 1,887,495 | A | 11/1932 | Carter |
| 2,147,052 | A | 2/1939 | Nonne |
| 2,152,895 | A | 4/1939 | Longtin |
| 2,245,306 | A | 6/1941 | Smith |
| 2,331,629 | A | 10/1943 | Reilly |
| 2,350,166 | A | 5/1944 | Kimes |
| 2,405,269 | A | 8/1946 | Prutsman |
| 2,449,609 | A | 9/1948 | Linder et al. |
| 2,458,076 | A | 1/1949 | Houston |
| 2,517,771 | A | 8/1950 | Stefanoy |
| 2,552,941 | A | 5/1951 | Courtne |
| 2,598,875 | A | 6/1952 | Anderson |
| 2,608,336 | A | 8/1952 | Dole |
| 2,936,849 | A | 5/1960 | Larson |
| 2,945,713 | A | 7/1960 | Sears |
| 3,016,103 | A | 1/1962 | Studer |
| 3,047,061 | A | 7/1962 | Wilcox et al. |
| 3,165,170 | A | 1/1965 | Blaney |

(Continued)

*Primary Examiner*—Hugh B. Thompson, II
(74) *Attorney, Agent, or Firm*—Graybeal Jackson Haley LLP

(57) ABSTRACT

A quick release ladder leveler attachment system. So that a leveler may be mounted or released from the rails of a ladder quickly and without requiring the use of tools, a leveler attachment structure is added to the lower outer surface of the ladder rails. It may be integrated with the ladder rails or attached to ladder rails with bolts or rivets. The attachment structures include surfaces that engagingly mate with mounting structures on the leveler. The attachment and mating structures may be a keyhole slot and a knob. A spring catch may retain the leveler in place and a locking pin may be added to ensure safety.

36 Claims, 3 Drawing Sheets

U.S. PATENT DOCUMENTS

| | | | | |
|---|---|---|---|---|
| 3,170,708 | A | | 2/1965 | Miller |
| 3,173,512 | A | | 3/1965 | Sturdy et al. |
| 3,179,206 | A | | 4/1965 | Sturder |
| 3,233,702 | A | | 2/1966 | Lent |
| 3,233,703 | A | | 2/1966 | Feltrop |
| 3,406,785 | A | | 10/1968 | Pilcher |
| 3,484,814 | A | | 12/1969 | Meehan |
| 3,527,321 | A | | 9/1970 | Brown |
| 3,554,321 | A | | 1/1971 | Steadman |
| 3,882,966 | A | | 5/1975 | Fasano |
| 3,908,796 | A | | 9/1975 | Hurwitz |
| 3,948,352 | A | | 4/1976 | Larson et al. |
| 3,973,860 | A | | 8/1976 | Kern |
| 4,014,406 | A | | 3/1977 | Easton |
| 4,085,820 | A | | 4/1978 | Cerny |
| 4,095,671 | A | | 6/1978 | Forristall et al. |
| 4,147,231 | A | | 4/1979 | Chantler et al. |
| 4,249,638 | A | | 2/1981 | Fernandez |
| 4,423,797 | A | | 1/1984 | Batten |
| 4,606,432 | A | | 8/1986 | Belt |
| 4,607,726 | A | | 8/1986 | Davis et al. |
| 4,683,980 | A | | 8/1987 | Vayko |
| 4,744,441 | A | | 5/1988 | Sandstrom |
| 4,766,976 | A | | 8/1988 | Wallick |
| 4,802,471 | A | | 2/1989 | Cordell |
| 4,807,720 | A | | 2/1989 | Kim |
| 4,984,655 | A | | 1/1991 | Schepreret al. |
| 4,995,474 | A | | 2/1991 | Gauthier |
| 5,027,923 | A | | 7/1991 | Derome |
| 5,044,468 | A | | 9/1991 | Worthington |
| 5,148,892 | A | | 9/1992 | Lu |
| 5,174,412 | A | | 12/1992 | Vega |
| 5,222,575 | A | | 6/1993 | Santos |
| 5,273,133 | A | | 12/1993 | Thocher et al. |
| 5,307,900 | A | | 5/1994 | Noga |
| 5,325,936 | A | | 7/1994 | Baker |
| 5,341,899 | A | | 8/1994 | Casamento |
| 5,464,071 | A | | 11/1995 | Rice |
| 5,476,153 | A | | 12/1995 | Dickerson et al. |
| 5,497,850 | A | | 3/1996 | Patterson |
| 5,507,364 | A | | 4/1996 | Spevak |
| 5,526,898 | A | | 6/1996 | Clark |
| 5,542,497 | A | | 8/1996 | Macyszyn |
| 5,551,529 | A | | 9/1996 | Molitor |
| 5,553,963 | A | | 9/1996 | Hoy |
| 5,609,222 | A | | 3/1997 | Horbacewicz |
| 5,669,462 | A | | 9/1997 | Jennings |
| 5,678,656 | A | | 10/1997 | Lanzafame |
| 5,695,164 | A | | 12/1997 | Hartman et al. |
| 5,704,451 | A | * | 1/1998 | King .......................... 182/204 |
| 5,718,306 | A | | 2/1998 | Baker |
| 5,755,307 | A | | 5/1998 | Dunnewin et al. |
| 5,771,992 | A | | 6/1998 | Snyder |
| 5,791,438 | A | | 8/1998 | Kempton |
| 5,816,364 | A | | 10/1998 | Christy et al. |
| 5,845,744 | A | | 12/1998 | Beck et al. |
| 5,853,065 | A | | 12/1998 | Hutson et al. |
| 6,234,273 | B1 | | 5/2001 | Moore |
| 6,349,907 | B1 | | 2/2002 | Hollington |
| 6,374,947 | B1 | | 4/2002 | Nurkiowicz |
| D457,650 | S | | 5/2002 | MacDuff |
| 6,595,326 | B1 | * | 7/2003 | Dean .......................... 182/204 |
| D479,339 | S | | 9/2003 | McDonald |
| 6,702,066 | B1 | * | 3/2004 | Eaton ......................... 182/204 |
| 2002/0117821 | A1 | | 8/2002 | Abraham |
| 2003/0122333 | A1 | | 7/2003 | Abraham |

* cited by examiner

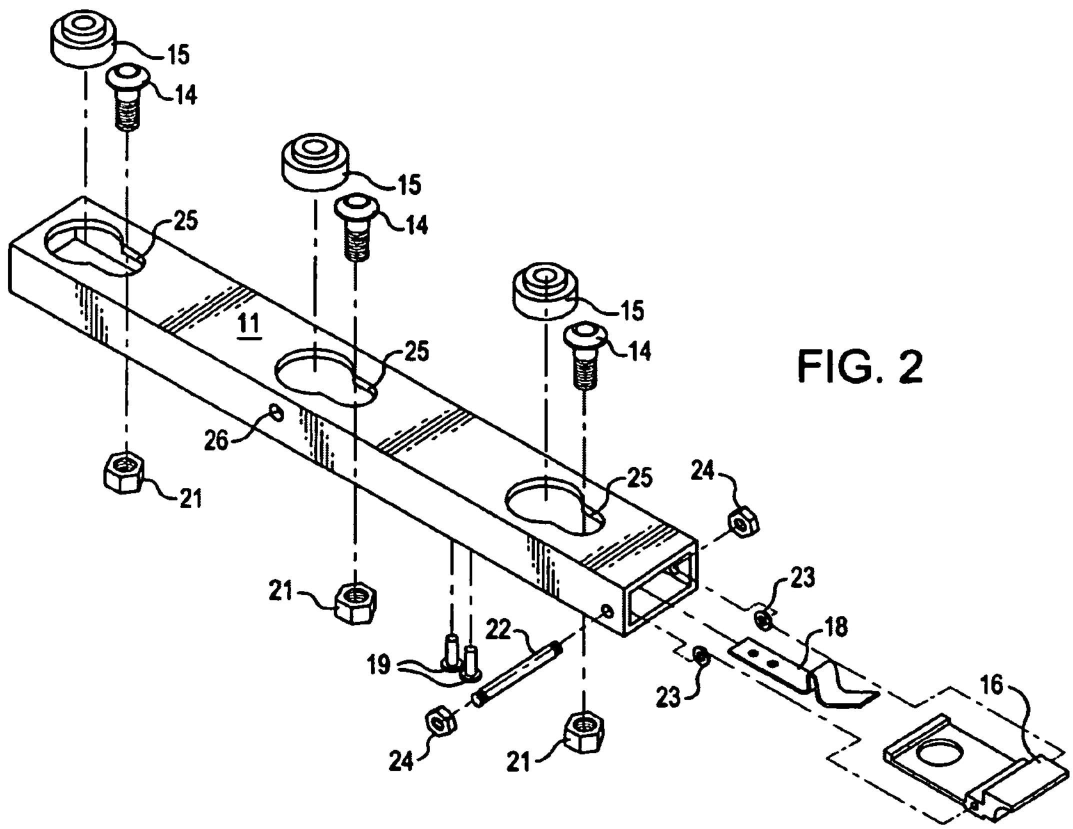
FIG. 2
FIG. 3
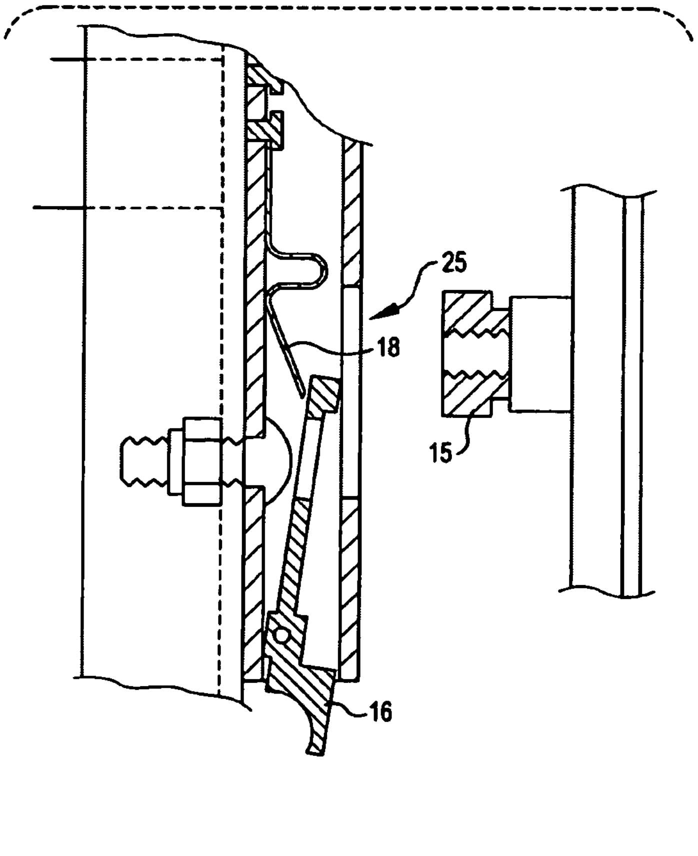

QUICK RELEASE FOR LADDER LEVELERS

BACKGROUND

For many types of ladders, including extension, combination, and sectional ladders, it is useful to have a leveler at the bottom of one leg or both legs. The leveler effectively adjusts the length of the bottom of the leg so that the ladder will go straight up from uneven ground or from different treads in a staircase. For safety, levelers are preferably securely bolted to the rails of the ladder or a static portion of the leveler may be integral with the leg of the ladder.

For ladders that are often used without a leveler, it is undesirable to have the extra weight of the levelers always present. Although levelers have been designed that quickly attach to rungs of a ladder or slip over the bottoms of the rails to achieve a quick attachment and release feature, these attachments are not sufficiently secure and include protrusions that catch on objects, damaging the object or the protrusion or creating a hazard.

SUMMARY OF THE INVENTION

The invention is a way of attaching a leveler to a ladder so that it can be quickly and securely mounted and released by hand without using tools. The outside of the bottom of each rail of a ladder is adapted with a leveler attachment structure that allows quick attachment and release of a leveler having a mating structure that mates with the attachment structure. The attachment structure may be a leveler attachment base that is attached to standard ladder rails, such as by bolts or rivets, or the attachment structure may be built into the ladder rails when the rails are fabricated.

In preferred embodiments, to mount the leveler, it is placed in engagement with the attachment structure where it is restrained against movement in all but two opposing directions and then it is slid in one of those two directions until it is caught by a movable catchment. Once it is caught, it is restrained against movement in 5 directions at right angles to each other by the attachment structure and it is restrained against movement in the sixth direction by the movable catchment until the catchment is released, releasing the leveler. This relationship of relative movement may be accomplished by a knob on one of the mating pieces and a slot on the other that receives the knob. The slot and the knob may be on either of the two pieces. Likewise, the movable catchment may be on either of the two pieces. The original directions in which movement is allowed may be up and down, in and out, or left and right.

In one aspect, the invention is a method of attaching a leveler to a ladder by procuring a ladder having at a lower end of each rail, on an outer surface of the rail, a leveler attachment structure that is adapted for hand releasably engaging a leveler and then releasably attaching to the structure a hand releasable leveler that matingly engages the structure. A hand movable catch retains the leveler in engagement with the attachment base. For added security, a locking pin may be inserted to prevent disengagement in the event the hand movable catch is accidentally released or fails.

In another aspect, the invention is a kit consisting of a ladder leveler plus an attachment base for connection between the leveler and the ladder. The leveler has a mating structure that engagingly and hand releasably mates with the base. The base has a ladder rail mating surface for attachment to a ladder rail and, opposite the mating surface, a leveler attachment structure that engagingly and hand releasably mates with the leveler.

In a third aspect, the invention is a hand releasable ladder leveler by itself. The leveler comprises a leveler body with a side for coupling with a ladder and, on that side, a hand releasable mating structure that engagingly mates with a leveler attachment structure. A hand releasable catchment releasably retains the leveler to the attachment structure. The hand releasable catchment may be a spring latch mounted on the leveler or it may be a catch surface that catches a spring latch mounted on the base. In one embodiment, the mating structures comprise knobs that matingly engage with slots in the base.

In a fourth aspect, the invention is a leveler attachment base for mounting on a ladder. The base has a flat surface on one side for mating with a rail of a ladder, the surface being at least one inch wide by eight inches high, and having at least two ladder rail attachment points. The attachment points may be holes for attachment with rivets or bolts or they may be protrusions that engage the ladder rail and are secured with pins or rivets. Opposite the ladder rail mating surface there is at least one leveler attachment structure that engagingly mates with a ladder leveler. The attachment structure may be a slot that engagingly receives a knob on the leveler. The base includes a hand releasable catchment for releasably retaining a ladder leveler, which may be a spring latch or a catch surface that catches a spring latch.

In a fifth aspect, the invention is a ladder that is supplied in the market place with leveler attachment structures all ready included on the outer surface of the lower end of each rail. Because the attachment structures are all ready included with the ladder, it is ready for attachment of a hand mountable and releasable leveler according to this invention. In this aspect, the invention comprises a ladder with two parallel rails connected by rungs and, on a lower end of an outer surface of each rail, at least one leveler attachment structure for engagingly mating with a ladder leveler. Associated with the attachment structure is a hand releasable catchment for releasably retaining a ladder leveler, which catchment may be a spring latch or a catch surface that catches a spring latch. The attachment structure may be a slot that receives a knob on a leveler. Conversely, the attachment structure may be a knob that engages a slot on a leveler:

BRIEF DESCRIPTION OF THE DRAWINGS

The features of the present invention which are believed to be novel are set forth with particularity in the appended claims. Aspects of the invention may best be understood by making reference to the following description taken in conjunction with the accompanying drawings wherein:

FIG. 2 is an exploded diagonal view of the leveler attachment base.

FIG. 3 shows a section view of a knob ready for insertion into a slot.

DETAILED DESCRIPTION

In the following detailed description of exemplary embodiments of the invention, reference is made to the accompanying drawings. The detailed description and the drawings illustrate specific exemplary embodiments by which the invention may be practiced. Other embodiments may be utilized, and other changes may be made, without departing from the spirit or scope of the present invention. The following detailed description is therefore not to be taken in a limiting sense, and the scope of the present invention is defined by the stated claims.

Figure 1:
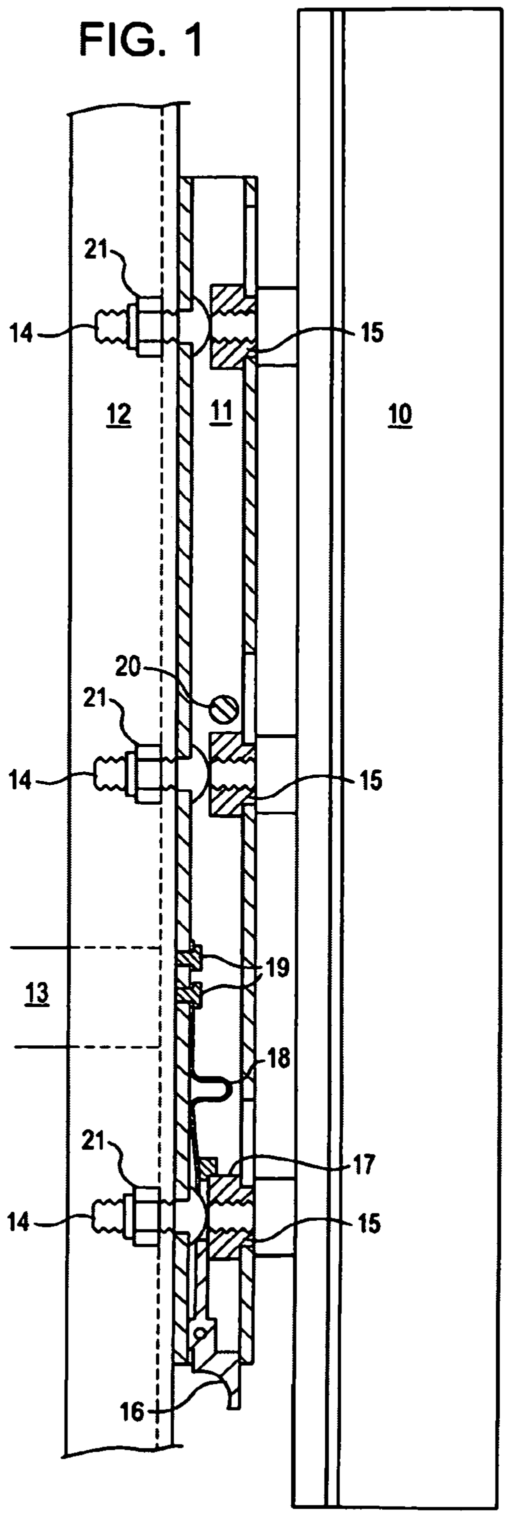
FIG. 1 shows one embodiment of a leveler and a leveler attachment base attached to a ladder rail.

FIG. 1 shows one embodiment of the leveler 10 and the leveler attachment base 11 attached to a ladder rail 12 with an exemplary rung 13. The attachment base 11, bolts 14 that secure the attachment base to the ladder rail, and knobs 15 that protrude from the leveler 10 and mate with the attachment base 11 are all shown in cross-section. Also shown is a spring latch 16 that catches on a catch surface 17 on one of the knobs 15. The latch 16 is held in a position engaging the catch surface 17 by a spring 18 which is held in place by two rivets 19. The cross-sectional view also shows the shaft of a locking pin 20 which may be inserted to insure safety. The locking pin may be a ring pin.

FIG. 2 is an exploded diagonal view of the leveler attachment base. It shows the parts identified in the previous paragraph and, in addition shows a hinge pin 22 that passes through the base 11 and the spring latch 16 as well as through two washers 23 it is retained by a nut on each end 24. FIG. 2 also more clearly shows the nuts 21 that secure the attachment base 11 to the ladder rail 12 using the attachment bolts 14. FIG. 2 further shows the attachment structure 25 that engages a mating structure 15 from the leveler. In the embodiment shown in FIG. 2, each attachment structure is a keyhole slot, each mating structure is a knob, and the design includes three pairs of keyhole slots and knobs. Any of many alternative structures for hand releasably engagingly mating the leveler to the attachment base could be used. For example, slots that those shown in FIG. 2 could be on the leveler and knobs like those shown in FIG. 2 could be on the attachment base. In addition, the structure of the attachment base can be integrated with the rail of a ladder.

FIG. 2 shows a hole 26 for receiving a locking pin, not shown.

The dimensions of the attachment base 11 should be at least one inch by eight inches to insure adequate rigidity in its connection to the ladder rail and to the leveler. In one embodiment, the dimensions of the attachment base are one and one-half inch by 12 inches. The attachment base need be only as thick as necessary to perform all of its functions. In one embodiment made of 6063-T52 aluminum rectangular tubing with one-eighth inch wall thickness, the base is three-quarters inch thick in the smallest dimension of the base.

To clarify the operation of the spring latch 16, FIG. 3 shows a section view of a knob 15 ready for insertion into a slot 25. The spring 18 hold the latch against dimension 25.

Figure 4:
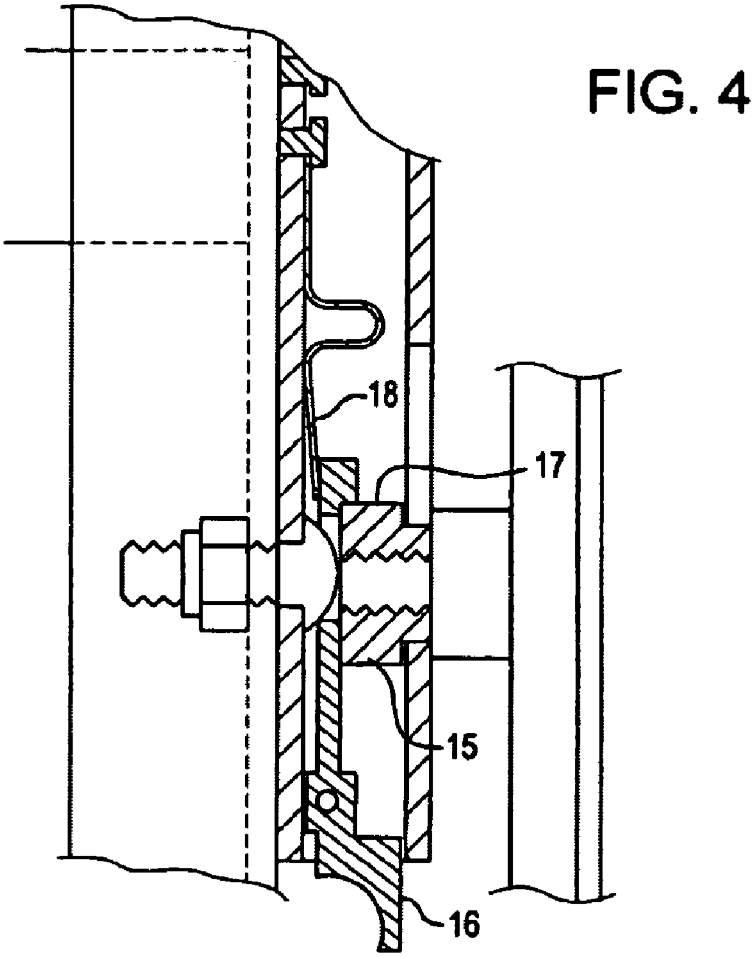
FIG. 4 shows the knob in the latched position.

FIG. 4 shows the knob 15 in the latched position. The spring 18 holds the latch 16 into a position that catches the catch surface 17 of the knob 15.

Although the present invention has been described in considerable detail with reference to certain embodiments, other embodiments are possible. Therefore, the spirit or scope of the appended claims should not be limited to the description of the embodiments contained herein. It is intended that the invention resides in the claims hereinafter appended.

I claim:

1. A hand-releasable leveler kit for a ladder, comprising:

(a) a ladder leveler with a static portion having a mating structure that engagingly, non-adjustably, and hand-releasably mates with an included ladder leveler attachment base;

(b) the ladder leveler attachment base having a ladder rail mating surface for attachment to a ladder rail and, opposite the mating surface, a leveler attachment surface having at least one hole that engagingly, non-adjustably, and hand-releasably mates with the ladder leveler; and (c) at least one locking pin mounted on the static portion of the leveler that, when inserted into the at least one hole, locks the static portion of the leveler to the attachment base.

2. A hand-releasable ladder leveler, comprising:

(a) a leveler having a side for coupling with a ladder rail, the leveler defining six directions of up and down along the leveler, in toward the side for coupling with a ladder rail and out away from the side for coupling with a ladder rail, and left and right perpendicular to the up and down directions and the in and out directions;

(b) on the leveler, directed to the side for coupling with a ladder, a leveler mating structure comprising at least two mating surfaces oriented with respect to each other so that a leveler attachment structure is restrained by the mating surfaces against movement with respect to the leveler in five of the six directions; and (c) a catchment surface that restrains the leveler attachment structure against movement in the sixth direction until a hand-releasable release is actuated to allow movement in the sixth direction which releases the leveler attachment structure.

3. The ladder leveler of claim 2 wherein the sixth direction is up.

4. The ladder leveler of claim 2 wherein the sixth direction is one of left or right.

5. The ladder leveler of claim 2 wherein the sixth direction is one of down or out.

6. The ladder leveler of claim 2 wherein the catchment surface is a surface of a retained, hand-movable latch on the leveler.

7. The ladder leveler of claim 2 wherein the catchment surface is a surface that catches a movable latch on the ladder.

8. The ladder leveler of claim 2 wherein the leveler mating surfaces comprise at least one slot that receives a leveler attachment structure.

9. The ladder leveler of claim 2 wherein the leveler attachment surfaces comprise at least one protrusion that receives a leveler attachment structure.

10. The ladder leveler of claim 9 wherein the protrusion is a knob.

11. The ladder leveler of claim 2 further comprising a safety lock that locks the leveler to the ladder.

12. The ladder leveler of claim 11 wherein the safety lock is a locking pin.

13. A leveler attachment base for a ladder, comprising:

(a) a base with a flat ladder rail mating surface, at least 1 inch wide by 8 inches high, with at least two ladder rail attachment points;

(b) each base defining six directions of up and down along the rail mating surface, in toward the rail mating surface and out away from the rail mating surface, and left and right perpendicular to the up and down directions and the in and out directions, each base having an outside opposite the rail mating surface;

(c) on the base, directed to the outside of the base, at least two leveler attachment surfaces oriented with respect to each other so that a leveler mating structure is restrained by the attachment surfaces against movement with respect to the base in five of the six directions; and (d) a catchment surface that restrains the leveler mating structure against movement in the sixth direction until a release is actuated to allow movement in the sixth direction which releases the mating structure.

14. The leveler attachment base of claim 13 wherein the sixth direction is down.

15. The leveler attachment base of claim 13 wherein the sixth direction is one of left or right.

16. The leveler attachment base of claim 13 wherein the sixth direction is one of up or out.

17. The leveler attachment base of claim 13 wherein the catchment surface is a surface of a retained, hand-movable latch on the base.

18. The leveler attachment base of claim 13 wherein the catchment surface is a surface that catches a movable latch on the leveler.

19. The leveler attachment base of claim 13 wherein the leveler attachment surfaces comprise at least one slot that receives a mating structure of a leveler.

20. The leveler attachment base of claim 13 wherein the leveler attachment surfaces comprise at least one protrusion that mates with a mating structure of a leveler.

21. The leveler attachment base of claim 20 wherein the protrusion is a knob.

22. The leveler attachment base of claim 11 further comprising a safety lock that locks the leveler to the attachment base.

23. The leveler attachment base of claim 22 wherein the safety lock is a locking pin.

24. A ladder with leveler attachment structures, comprising:

(a) a ladder with two parallel rails connected by rungs, each rail defining six directions of up and down along the rail, in toward the rungs and out away from the rungs, and left and right perpendicular to the up and down directions and the in and out directions, each rail having a bottom portion at least two feet long, an inside facing the rungs, and an outside opposite the inside;

(b) on the bottom portion of each rail, directed to the outside of each rail, a leveler attachment structure comprising at least two attachment surfaces oriented with respect to each other so that a leveler mating structure is restrained by the attachment surfaces against movement with respect to the rail in five of the six directions; and (c) a catchment surface that restrains the leveler mating structure against movement in the sixth direction until a release is actuated to allow movement in the sixth direction which releases the mating structure.

25. The ladder of claim 24 wherein the sixth direction is down.

26. The ladder of claim 24 wherein the sixth direction is one of left or right.

27. The ladder of claim 24 wherein the sixth direction is one of up or out.

28. The ladder of claim 24 wherein the catchment surface is a surface of a hand-movable, retained latch on the ladder.

29. The ladder of claim 24 wherein the catchment surface is a surface that catches a movable latch on the leveler.

30. The ladder of claim 24 wherein the leveler attachment surfaces comprise at least one slot that receives a mating structure of a leveler.

31. The ladder of claim 30 wherein the slot is in a plate attached to the ladder rail on the outside of the bottom portion.

32. The ladder of claim 30 wherein the slot is in a plate that is a part of the ladder rail.

33. The ladder of claim 24 wherein the leveler attachment surfaces comprise at least one protrusion that mates with a mating structure of a leveler.

34. The ladder of claim 33 wherein the protrusion is a knob.

35. The ladder of claim 22 further comprising a safety lock that locks the leveler to the ladder.

36. The ladder of claim 35 wherein the safety lock is a locking pin.

* * * * *